Dec. 19, 1933.  L. A. M. CORSET  1,939,766
TRANSMISSION DEVICE
Filed Oct. 22, 1931    2 Sheets-Sheet 1
Fig. 1
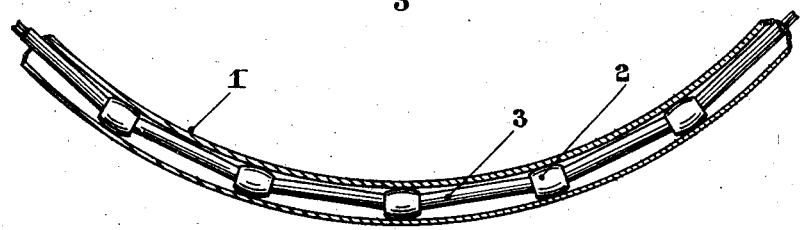
Fig. 2
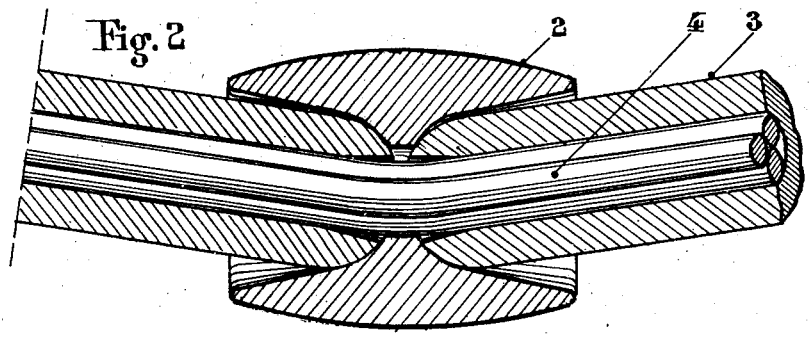
Fig. 3   Fig. 4   Fig. 5
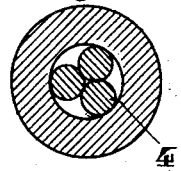 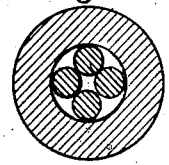 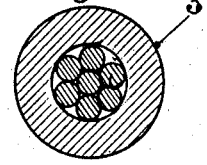
Fig. 6
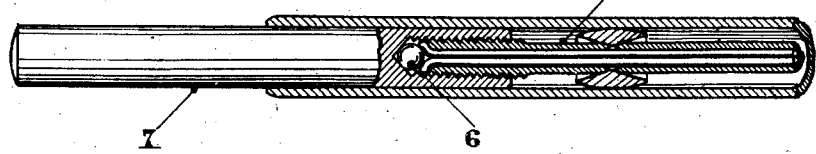
Inventor:-
Lucien Alfred Maurice Corset
by E. F. Underoth
Atty.

Patented Dec. 19, 1933

1,939,766

UNITED STATES PATENT OFFICE 1,939,766

TRANSMISSION DEVICE

Lucien Alfred Maurice Corset, Paris, France

Application October 22, 1931, Serial No. 570,446, and in France November 18, 1930

2 Claims. (Cl. 74—39)

The present invention has for its object a device for mechanical linear transmission by means of a tubular guide capable of acting under tension and under pressure and having the following features.

1. It is formed by a series of tubular elements of which the bores serve as seatings for a metal cable and which are connected at their ends by a ball joint to olive shaped members or barrels, the assemblage thus formed being located in a metal tube of suitable resistance.

2. The end tubular elements and the ends of the central cable are secured on the one hand to the operating member and on the other hand to an actuating member on the device to be operated.

3. The elements of the tubular series are accurately adjusted in spherical seatings in the barrels in such a manner that there is no longitudinal play between the separate members which form the transmission.

4. The central cable may be formed of any suitable number of metal wires of high resistance.

5. The separate strands which form the cable are not twisted together or are only slightly twisted together.

6. In a particular form of construction of the invention the guide tube may be omitted, the transmission being then applied as a resistance support adjustable as to flexion, and this resistance is obtained by means of a member enabling the last tubular element and the last barrel to be spaced. In this case the internal cable, which is suitably insulated, may at the same time serve as a conductor for electric current.

In the accompanying drawings

Figure 1 is a view in longitudinal section of a transmission device constructed in accordance with the invention.

Figure 2 illustrates upon a larger scale and in longitudinal section an olive shaped member with spherical recesses and the seating in this olive shaped member of two adjacent tubular elements.

Figure 3 is a view in section of a tubular element provided with a cable having three wires.

Figure 4 is a similar view in cross section of a tubular member containing a cable with four wires.

Figure 5 is a similar view of a tubular element receiving seven wires.

Figure 6 is a view in section of the end of the guide tube showing the manner in which the cable and the last tubular element are connected to an end slide or operating member.

Figure 7:
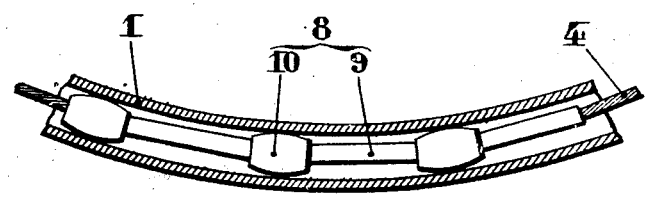
Figure 7 is a view in longitudinal section of a modification of construction of a transmission device constructed in accordance with the invention.

As will be seen in the drawings (Figures 1 and 2), a pliant transmission device constructed in accordance with the invention is essentially formed of a series of two types of elements, generally located in a tube 1, preferably of metal and capable of receiving suitable curvatures.

The elements which form the series are on the one hand olive shaped members or barrels 2, and, on the other hand, transom tubes 3.

The tubes 3 are terminated at their ends with semi-spherical surfaces which accurately bear upon hollow surfaces of the same character provided in the olive shaped members 2.

The semi-spherical surfaces on which the ends of the tubes 3 bear, in the olive shaped members, are extended outwardly having truncated cavities of which the inclination is such as to permit of an angular displacement of predetermined amplitude of the tramson tubes relatively to the olive shaped members.

The assemblage thus formed by the tubes and by the olive shaped members is traversed along its entire length by one or more wires 4 made of a metal of high resistance. These wires form the cable adapted to support the pulling forces.

The cable may be formed of any suitable number of wires. For example it may be formed of one, three (Figure 3), four (Figure 4), seven (Figure 5) nineteen etc., and the assemblage of wires is located in the cylindrical cavities of the transom tubes with a small amount of play. The wires 4 thus mounted cannot be twisted among themselves but are disposed longitudinally along side one another.

Each end of the series is formed by a separate transom tube which is screw threaded, and in which the wires 4 are soldered, preferably with tin so as to avoid heating them to too high a temperature.

The end transom tubes 5 are screw threaded into the end rod 7 which is adapted to act on an operating member. It will be seen that by reason of this arrangement, when the entire series is mounted in such a manner that there is no longitudinal play in the joints of the transsoms on the olive shaped members, there is obtained a transmission of a certain transverse pliability but which is rigid longitudinally.

The fluid-tight tube 1, which is lubricated in the interior, may be secured or attached to walls or to machines according to the purpose for which the transmission is to be used.

If, for example, there is mounted on the rod 7 a hinged cap, actuated by a lever for producing a to and fro movement of the transmission, it will be seen that this movement is faithfully repeated at the other end without intervention of return springs or counter weights and absolutely the same as if a straight rod were moved in a straight tube.

In fact, in this case any pull applied to the rod 7 is translated, by means of the cable, by a pull of the same magnitude at the other end of the series. As regards pushes to which the rod 7 is subjected, they are also transmitted to the other end by means of the successive pushes of the transoms on the olive shaped members and by these to the succeeding transsoms.

This transmission device has remarkable advantages in comparison with similar devices which are known.

In one of these known systems the transmission of movement is effected without an internal cable, this movement can only be obtained by compression. The pushers are in one or two parts, but are rigid with their olive shaped members and incline considerably in the tubes at the bent portions thereof.

It thus results that the longitudinal curvature of the olive shaped members of these pushers should be sufficiently large so that the edge of the recess does not come into contact with the interior of the tube which would cause a serious resistance to sliding movement. Nevertheless, the pronounced curvature of the olive shaped member causes the inconvenience of setting up a certain amount of friction and, consequently, leading to rapid wear of the tube.

In the device forming the subject of the present invention the radius of curvature of the olive shaped member 2 may, without inconvenience, be the same as the radius of curvature of the tube 1, and, as the olive shaped member is, in all respects, of a diameter slightly less than the internal diameter of the tube, it is possible to apply to the device forming the subject of the invention olive shaped members of zero curvature, that is to say they may be cylindrical, a simple chamfer at the ends avoiding any jamming in the tube.

The possibility of constructing the olive shaped members as cylindrical elements leads to considerable simplicity in manufacture, particularly as these elements are made of a hard metal.

The olive shaped member or barrel 2 consequently bears against the interior wall of the tube 1 with a freer surface which improves the efficiency of the transmission, enables greater forces to be produced and substantially reduces wear, the lubricant being scraped to a lesser extent than by the olive shaped member of a rigid pusher.

The portion of the olive shaped member 2 which intervenes in the length of the transmission is reduced to the very slight distance which separates two semi-spherical recesses forming the joint and the differences in length which may result by reason of expansion are reduced to a minimum.

By a first inspection it appears that the device which forms the subject of the present invention has greater risks of breaking under the action of pull than under compression, because in the latter case the rocking of the transom tubes 3 is limited by the walls of the guide tube 1.

In reality, the lateral reactions and the friction which result are less important for the pulling force than for the compression force.

On the other hand, the wires of high resistance which form the cable are disposed longitudinally or only slightly twisted one upon the other, and, consequently, only operate under simple push and their considerable elasticity absorbs all the shocks to which the transmission may be subjected.

Corrosion of the wires is entirely prevented by reason of the ready penetration of lubricating oil between all the elements of the series.

When forming the cables of wires known as piano wires, there is obtained for the pulling member, in addition to great pliability, a considerable resistance which is greater than that which is obtained with a single wire of which the cross sectional area is equal to the sum of the cross sectional areas of the piano wires.

The resistance to breaking of the guide tube 1, which sometimes operates under extension, need not be considered in the present case, as it is of a degree greater than that of the bundle of wires forming the cable.

In cases in which the transmission is formed in two or more sections, the end rod 7 is replaced by a screw threaded sleeve into which is screwed the screwed end of the section. As regards the guide tubes, these are connected end to end by any suitable known means.

Figure 8:
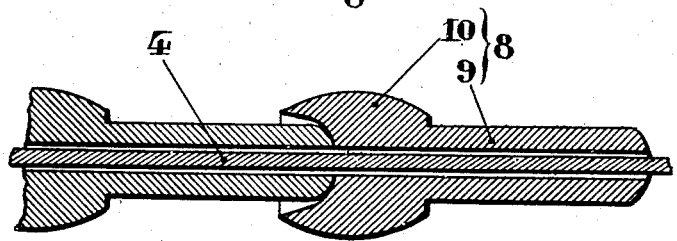
Figure 8 illustrates upon a larger scale and in longitudinal section a jointing of two adjacent elements of the transmission device shown in Figure 7.

In the modified form of construction illustrated in Figures 7 and 8, each element 8 of the series is formed by a tubular portion 9 integral with an olive shaped head 10, the head being provided with a truncated recess in which fits the tubular end 9 of the adjacent element. The truncated recesses have an inclination so as to permit of an angular displacement of predetermined amplitude of the transom elements 8 relatively to one another.

Figure 9:
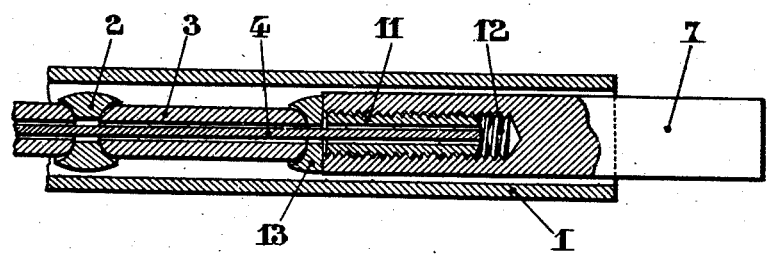
Figure 9 is a view in section of the end of the guide tube showing another manner of connecting the cable and the last tubular element to the end slide or operating member.
Figure 10:
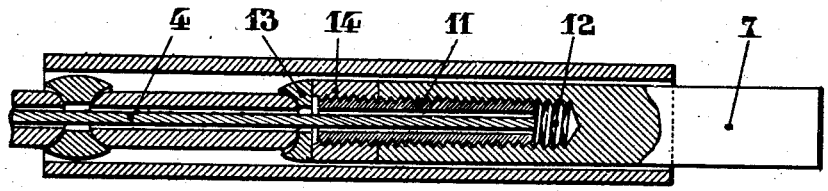
Figure 10 is a modification of a detail of Figure 9.

In the modification of the method of connecting the cable and the last element to the end slide or operating member, which modification is illustrated in Figure 9, the end of the cable 4 is secured to an end sleeve 11 screwed into a screw threaded seating 12 of the operating rod 7. Between the last interposed element 3 and in front of the rod 7 is provided a half olive shaped member 13 of which the plane face is turned towards the rod 7. The members 11 and 7 screw with slight friction one upon the other. It is sufficient, after some wear, to slightly turn the operating rod 7, which then screws on the sleeve 11, pressing against the half olive shaped member and, consequently, compressing all the elements 2 and 3 until all the longitudinal play has been taken up.

In certain cases it is possible to interpose between the half olive shaped member 13 and the rod 7 a locking nut 14 screwed on the sleeve 11.

In addition to this partial automatic arrangement the device may be used whilst temporarily omitting the external connection of the operating rod with the mechanism which it is adapted to actuate, and this without it being necessary to remove the transmitting tube or even withdraw the series of members.

If, for example, it is desired to produce in this way a support for an electrical apparatus, the bundle of cables, suitably insulated from an electrical point of view, may serve as a current conducting wire for the current whilst retaining its mechanical operation.

These applications of the device which forms the subject of the present invention are only given by way of example and their enumeration is not limitative.

What I claim is:—

1. In combination, a guiding tube, a cable, a plurality of guiding elements strung on said cable and contacting externally with said guiding tube, and a plurality of elongated transom tubes strung on said cable and intercalated between adjacent guiding elements, said tubes being of greater length and of lesser section than said guiding elements.

2. A device according to claim 1 including an operating member, a threaded sleeve secured to an end of the said cable and screwed with slight friction into said operating member, an intermediate member suitably disposed between the end element of said plurality of guiding elements and the operating member whereby, upon rotation of the operating member the said sleeve is moved relative to the operating member for eliminating play in the plurality of guiding elements.

LUCIEN ALFRED MAURICE CORSET.